United States Patent [19]

Hufford et al.

[11] 4,285,143

[45] Aug. 25, 1981

[54] SOLAR GRAIN DRYING/STORAGE BUILDING

[76] Inventors: Jack E. Hufford; William E. Mosmeier, both c/o Iron Horse Bldgs., Circleville, Ohio 43113

[21] Appl. No.: 31,324

[22] Filed: Apr. 18, 1979

[51] Int. Cl.³ .............................................. F26B 3/28
[52] U.S. Cl. ......................................... 34/93; 34/233; 126/428; 126/431; 126/448
[58] Field of Search ............... 126/429, 431, 428, 448; 34/93, 233; 165/173

[56] References Cited

U.S. PATENT DOCUMENTS

| 430,762 | 6/1890 | Taylor | 34/93 |
|---|---|---|---|
| 3,919,784 | 11/1975 | Tonn | 126/428 |
| 4,009,520 | 3/1977 | Sukup | 34/233 |

FOREIGN PATENT DOCUMENTS

| 2808814 | 9/1978 | Fed. Rep. of Germany | 126/429 |
|---|---|---|---|
| 79085 | 10/1918 | Switzerland | 34/93 |

Primary Examiner—Larry I. Schwartz
Attorney, Agent, or Firm—Anthony D. Cennamo

[57] ABSTRACT

An enclosure for drying and storing grain or crops utilizing solar energy wherein an entire structural side (wall or roof) is of transparent material. An inner wall is positioned adjacent the transparent wall and an absorbent material is positioned intermediate the transparent and inner wall. The inner and outer walls form a duct for the passage of air past the absorbent material. The heated air is directed to a plenum/manifold which in turn is connected to a tubing having a multiplicity of perforations (ports) therein. The tubing extends back and forth in an array over the entire floor of the enclosure. The air passing upwardly through the ports in the tubing array provides a uniform distribution of heated air to the crops placed in the enclosure.

10 Claims, 5 Drawing Figures

SOLAR GRAIN DRYING/STORAGE BUILDING

BACKGROUND OF THE INVENTION

The invention relates generally to a crop-drying/storing enclosure which employs solar-heated air through an array of tubing in the floor of the enclosure to the crop.

In the drying of crops, such as corn, wheat, soybeans, tobacco, and the like, the crops are placed in some sort of an enclosure having means for the passing of air through the crops. In most instances, the air is heated by gas burners or other conventional systems.

In crops such as corn and wheat, the moisture contents must be controlled for the processing of the grain to avoid spoilage and for quality control. In the drying of tobacco, the moisture control is extremely critical that also affects the quality of tobacco. Crop drying/storage enclosures of the prior art have been confronted with the problem of obtaining an even distribution of air through the crop. If the drying medium is natural air, the enclosure is restricted to size and in dimension. If the air is heated, the distribution mechanism has not hereintofore provided a uniform distribution of air into the crops. It is well understood that although artificial heating does do the job of grain drying, whereas, in most instances, natural air will not, the quality of the grain drying with artificial heat is inferior to that dried by natural air. Again, it also is understood that natural air requires several months for grain drying; during which time moisture periods may and does cause mildewing and rot. Accordingly, natural air drying without the attendant disadvantages accompanied by periods of high moisture, appear to be the most ideally suited for grain drying.

Solar panels can be utilized with conventional crop enclosures for the heating of air. But, the cost of these panels and the cost of distributing the air through the crops is extreme—and not entirely satisfactory. Solar heating such as by "hot houses" does provide maximum such utilization which in turn provides heating of the natural air. However, the prior art glass panelled or sheet plastic house is not sufficiently rugged or suitable for the storing of crops; but, even more so, they are moisture confining.

To avoid the high cost solar panels of the prior art attempts have been made to compromise the solar panels with the hot house; that is, to provide for a crop enclosure with auxiliary solar structures. In some instances, the appendant structure may be of the hothouse type in combination with a conventional crop enclosure such as shown in U.S. Pat. No. 3,919,784.

Again, even the appendant structure with a conventional type of crop enclosure, there is the crop factor of a conventional crop enclosure and added thereto the cost of a hot-house structure. But, ignoring the cost factor and assuming the air is sufficiently and properly heated, there still remains the efficient utilization of the solar-heated air.

OBJECTS

Accordingly, it is a principal object of the present invention to provide a solar heated enclosure for crop drying/storing that overcomes the above-noted prior art disadvantages attendant with artificial heat drying and solar heated enclosures.

A further object is to provide such a structure that is without appendages and wherein the structural rigidity of the enclosure has not been sacrificed but yet provides an efficient solar heat collector for the crop enclosure.

Another object of the invention is to provide such a structure with efficient utilization of the solar-heated air through a uniform air distribution in the floor of the crop enclosure.

Other objects and features of the present invention will become apparent from the following detailed description when taken in conjunction with the drawings in which:

SUMMARY OF INVENTION

The preferred embodiment comprises an enclosure, such as a conventional type of barn, utilized for crop drying/storing. The entire structural one side of the barn is made up of transparent material. On the inside of the barn another wall is positioned adjacent the transparent wall; and intermediate the two walls is positioned an absorbent material for the absorption of solar radiation. The two walls form an air duct for the passage of air over the absorbent material; and in one instance, the intermediate positioned girths form series of air ducts. The outside air is taken in through a longitudinal opening, that may be centrally positioned vertically or alternatively horizontally positioned across the top of the side wall, to a plenum for the heated air redistribution. A plenum is positioned on either end of the wall with a horizontal elongated manifold therebetween. Connected across the manifold is tubing having a multiplicity of holes or ports therein. The tubing of relatively small diameter is formed in a planar array and which array is horizontally positioned to cover the entire floor of the enclosure. The forced upwardly air moving through the tubing ports blows an even distribution of solar-heated air to the crop. In a refined embodiment stacked arrays are disclosed. It has been found an average of 5° above outdoor ambient air can be maintained.

DETAILED DESCRIPTION OF DRAWINGS

Figure 1:
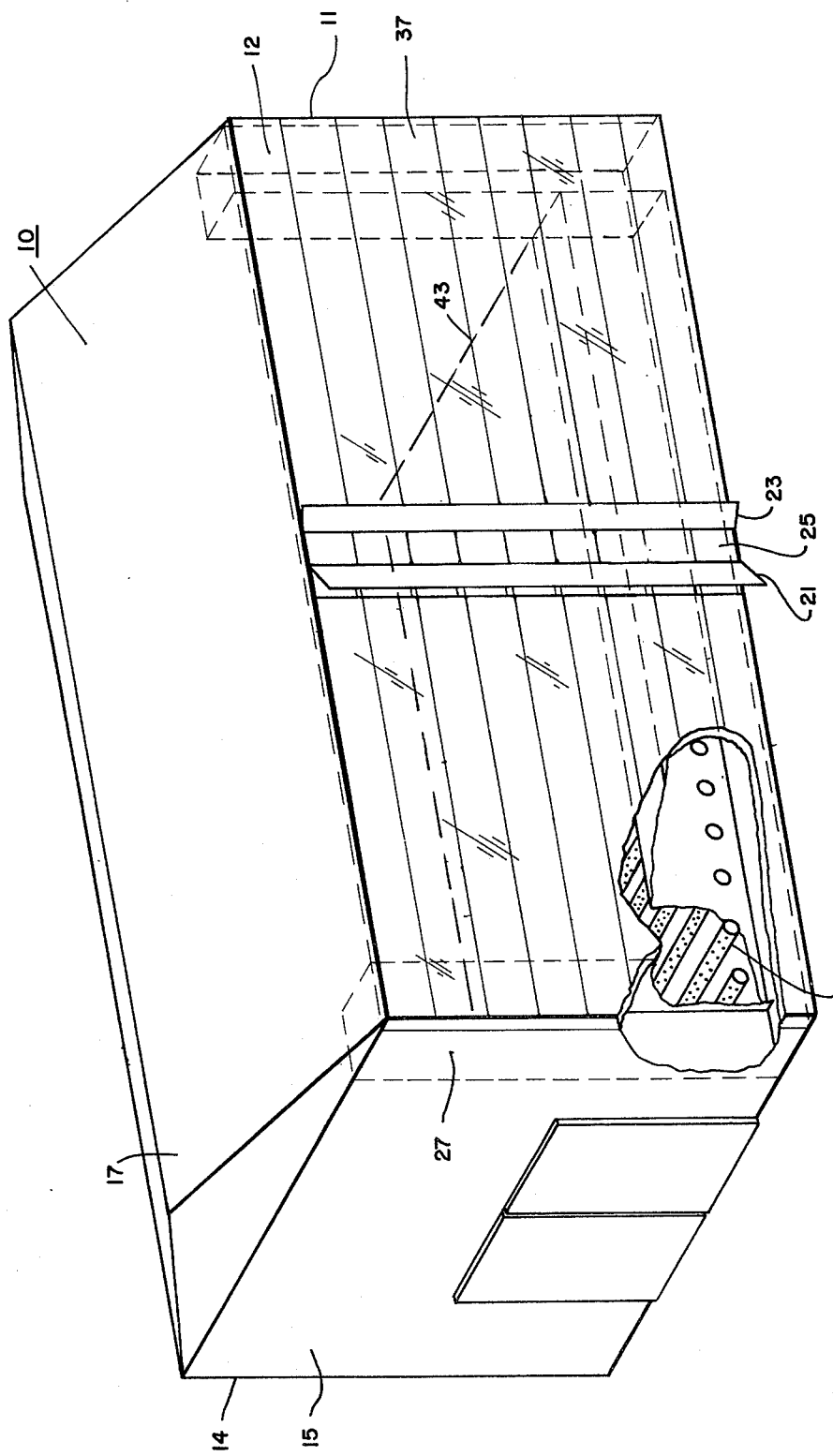
FIG. 1 is an overall view of an enclosure utilizing the principles of the present invention.
Figure 2:
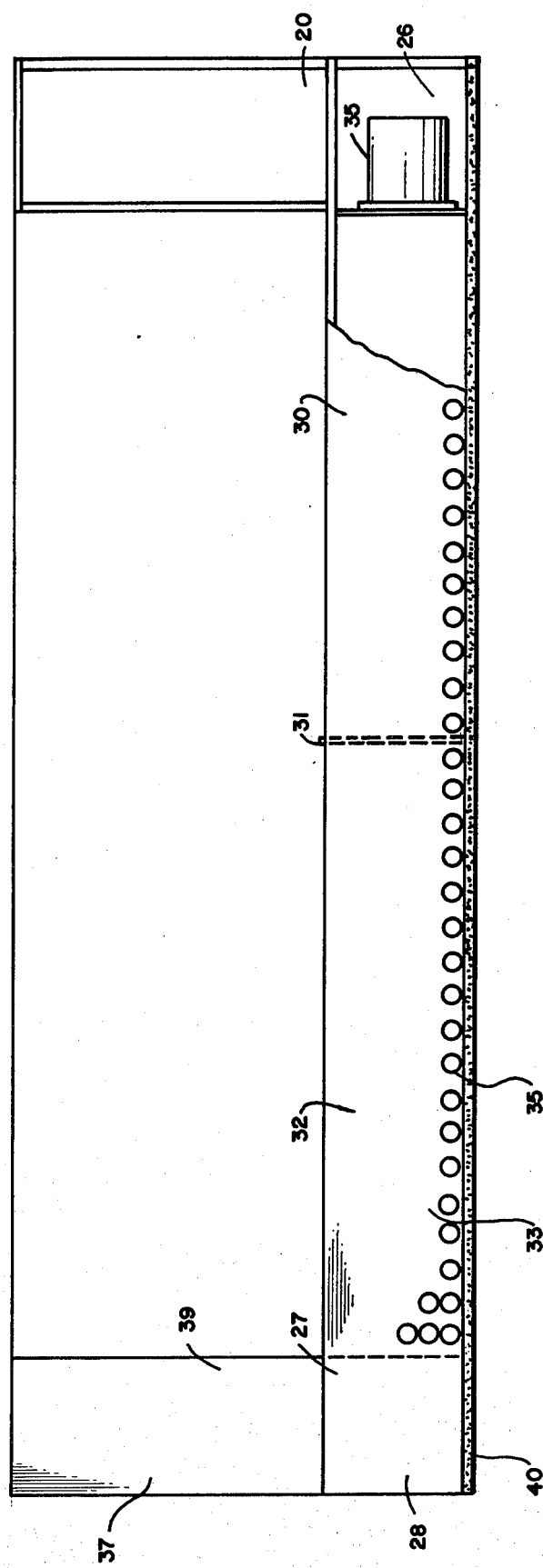
FIG. 2 is a side view of the plenum/manifold of the preferred embodiment.

With particular reference to FIG. 1 there is illustrated in an overall view in partial cutaway the preferred embodiment of the present invention as an enclosure 10 for crop-drying/storing utilizing solar-heated outside air.

The enclosure comprises sides 13 and 14, end walls 11 and 15, and a roof 17 most familiar to a typical general utility barn. This type of enclosure is similar to that marketed with corrugated metal sheets secured to a supporting structure. Structurally, the barn 10 of the preferred embodiment is constructed in exactly the same manner.

The primary distinction between the conventional six-sided barn and that of the preferred embodiment is not in changes in structure but additions to the one wall and the floor. Particularly, the wall 12 is of corrugated structural grade materail but differs from the conventional corrugated barn in that this wall 12 is of transparent material. This transparent material of wall 12 is commercially available and has a coating thereon to prevent yellowing or discolorization.

Figure 5:
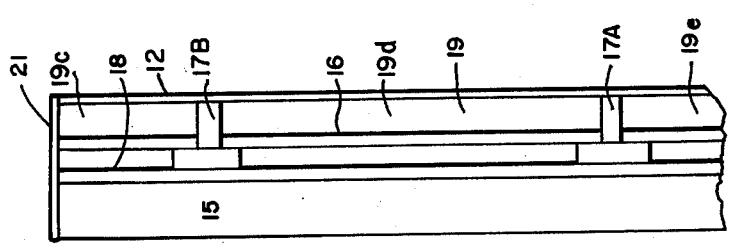
FIG. 4 is a top cross-sectional view and FIG. 5 is a side cross-sectional view of the solar collector.
Figure 4:
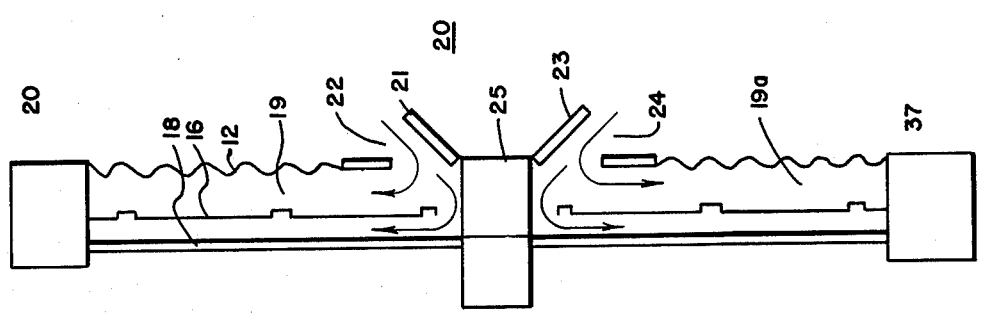

With reference to FIGS. 4 and 5 there is illustrated in crosssection the additions to the wall 12. That is, positioned a short distance back from wall 12 on its inside is a second wall 18. The wall 18 is of solid material and can be comprised of most any insulating material. In that it has no structural requirements, it can be made extremely inexpensive. In the preferred embodiment a one inch thick polystyrene, foil faced, insulation board was used.

Intermediate the outside wall 12 and the inner wall 18 is a sheet of solar absorbing material 16. The absorbent material 16 is the conventional black and simply may be a sheet of plywood coated with bituminous asphalt. Other absorbent materials are known in the art. Alternatively, many other prior art sheet absorbers may be utilized.

It can be readily seen that the two walls when capped at the top by cap 21 at roof 17 form an air duct 19 of extremely large proportions.

Air, preferably outside circulated, in a forced airstream, as described hereinafter, is caused to enter air intake 20 and pass into the three wall enclosure ducts 19c, 19d, and 19e. Air intake 20 as shown in FIG. 4 is a vertical structure extending from the ground to the uppermost end of side 12. The intake 20 comprises louvers 21 and 23 or doors that may alter or adjust the extent of air intake. It is to be noted in this embodiment with a vertical air intake, that in fact, there are two intakes 22 and 24. As will be explained below, there are two plenums and two blowers—a left/right air distribution system. The support 25 for the doors 21 and 23 further provides a divider between the two intake systems 22 and 24. Both doors 21 and 23 may be open to utilize the entire enclosure or the one or other door may be open when one plenum and one blower to utilize only one half of the enclosure for crop drying.

As intake air passes over the absorbent material 16 it is heated—the absorbent material being exposed to the solar radiation through the transparent wall 12. In this embodiment the absorber wall 18 is a corrugated black coated metallic sheet. The corrugation provides a larger surface for solar radiation absorption.

With reference to FIG. 2 through 6 the air circulation system of the preferred embodiment may be described. As noted above, the air intake 20 of FIG. 4 is a vertical air intake divided to provide air to either or both halves of the enclosure. Referring to FIG. 5, the walls 12 and 16 are supported by the horizontal girths 17a and 17b dividing the air duct into three horizontally aligned compartments 19c, 19d, and 19e. The three horizontal compartments are open on the inside and outside ends. Their inside ends open into the air intake 20; whereas their outside ends open into the plenums 27 and 37, respectively.

Plenums 27 and 37 comprise a box-like structure of a height equivalent to the height of wall 12. Simply, the entire wall 12 at its extreme ends opens into two plenums 27 and 37.

The extreme ends of the air duct 19, the two walls 12 and 18 lead into plenum 27. In this way, air enters the air intake 20, is directed over the absorbent material 16, is heated thereby, and then directed into the plenums 27 and 37 for redistribution to the tubing array 42.

It was stated above that the preferred embodiment has two primary distinctions over the crop-drying/storing enclosures of the prior art, to wit: the transparent solar wall 12 and the plenum/manifold and perforated tubing array 42 air distribution with the floor 40. With continued reference to FIG. 1, FIG. 3, and FIG. 7, there is illustrated the floor air distribution system of the preferred embodiment, to provide a constant flow, uniformly, of heated air to the stored grain.

Connected to the plenums 27 and 37/manifold 32 is tubing 30. This tubing as shown in FIG. 6 has a multiplicity of air holes or ports 38a xxx n formed therein. The ports 38a xxx n are evenly distributed around the entire periphery of the tubing. In certain applications with particular crops, it may be desired that the ports 38a xxx n be on the upper side only as shown in tubing 30a and 30b of FIG. 7A and 7B. In a stacked array as described hereinafter, it would be preferred that the ports be formed in the entire circumference of the tubing.

The tubing 30 is placed in a side-by-side array 42. The wall 33 of manifold 33 has at its bottom end a linear series of apertures 35 formed therein. In each aperture is positioned one end of a section of tubing 30. The other ends of tubing 30 in array 42 are interconnected at 34 to the crop retaining wall 43. The array 42 in an horizontal planar arrangement is placed broadside directly on the floor 40 of the enclosure 10.

In certain crop-drying/storing, a retaining wall 43 is neither used nor necessary; one such application would be in tobacco drying. In these instances, other means of relatively insignificant design may be utilized to interconnect the ends of 34 of the tubing 30.

Again, the air is driven via blower 29 from the air intake 20 of the enclosure 10 into the plenums 27 and 37 and the manifold 33. As the air passes over the absorbent material 16, it is heated and directed into the plenums 27 and 37. The plenums in turn redistribute the heated air via the intermediate manifold 33 to the array 42 of tubing 30 having holes 38a xxx n therein. The array 42 covers the entire floor 40 of the barn 10. The heated air, driven via a blower 21 from the plenum 27 into the tubing 30 via manifold 33, escapes from the holes 38a xxx n therein. In that the tubing 30 is over the entire floor 40, there is an even distribution of air passing upwardly into the crops 50 stored in the enclosure 10.

With the use of the enclosure 10 as a grain drying barn, a wall 43 of predetermined height surrounds the floor 40 as a grain 50 support and air confinement. The grain 50 in this instance has a constant flow of heated air therethrough as aforesaid.

Figure 3:
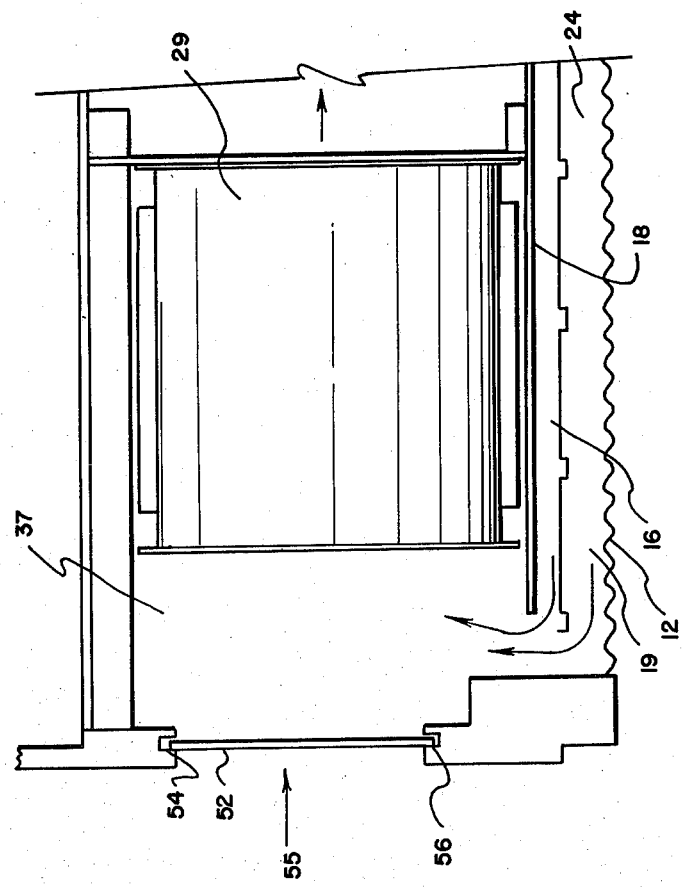
FIG. 3 is a top view of the plenum detail.

With reference specifically to FIG. 3, the plenums 27 and 37 provide additional air intakes at 55 (both sides are identical). If more air is desired, for whatever reason, than can be provided by air intake 20, the door 52 is lifted from its side supports 54 and 56 to permit air to enter directly into the plenums.

It can be appreciated that there may be a limitation as to the amount of air passing upwardly through the grain 50. That is, the depth of the grain resting on the tubing array 42 on the floor 40 is not infinite. Crops such as corn, wheat, etc., do permit the passage of air; however, there is an impediment to air passage. For instance, it has been found a depth of approximately four to eight feet is the limit for the free flow of air through the grain. To extend the use of the enclosure to include its entire inner space, the tubular array 42 air distribution may be stacked one over the other. Additional four feet walls similar to wall 43 are stacked one above the other. Tubing support means 49 are placed intermediate the stacked walls. Alternatively, the walls may have incorporated therein means for supporting the tubing arrays.

With the use of the enclosure as a tobacco drying barn, a single floor array of tubing may be sufficient in that the tobacco is hung and does not rest on the floor. However, additional arrays, one stacked over the other in a manner much similar to that of grain, may still be preferred to assure an even distribution of heated air throughout the entire barn. The number of arrays and their arrangement is a matter of decision relative to particular enclosure and the crop.

It is appreciated that the transparent sheets of corrugated material making up wall 12, such as those commercially available, do have transparency losses. However, the transparent wall 12 is of such an enormous size that a considerable amount of air is absorbed in sufficient amount to do the job.

Further, grain is generally harvested in the early fall. The drying period is immediately thereafter and only for a few months. Accordingly, the enclosure 10 when constructed has its transparent wall 12 facing the direct sun rays for the fall of the year.

Although the preferred embodiment is described as having a transparent wall, it is, of course, understood the roof may have a similar structure in lieu of or in addition to the wall.

I claim:

1. An enclosure for solar-heated air drying/storing of crops comprising:

one side of said enclosure in its entirety, having a structural transparent material, a wall positioned adjacent the inside of said transparent side to form an air duct, an absorbent material positioned in said air duct, and an air intake having means for passing air through said duct and over said absorbent material;

a plenum chamber connected to each of the extreme ends of said duct; a planar array of tubing having a multiplicity of air ports therein connected to said plenum, a blower for each of said plenum chambers directing air from said duct to said plenums and from said plenums to said tubing; and means positioning said planar array of tubing over the floor of said enclosure to direct solar heated air upwardly through the crops stored in said enclosure.

2. An enclosure for solar-heated air drying/storing of crops as set forth in claim 1 further comprises air intake openings, and wherein said air intake openings are positioned in said wall to open either or both halves of said enclosure, means for closing one or the other of said air intake openings to direct said intake air over half of said enclosure.

3. The enclosure of claim 1 wherein said air intake openings are centrally positioned in said wall and extend from the lower most position to the uppermost portions of said wall.

4. An enclosure for solar-heated air drying/storing of crops as set forth in claim 1 wherein said plenum and blowers further comprise a pair of plenums and a pair of blowers, and wherein said air intake is positioned to open either or both halves, means for closing one or the other half of said air intake to direct said intake air over half of said enclosure.

5. The enclosure of claim 1 wherein said tubing is in an array and evenly distributed over said floor.

6. The enclosure of claim 1 wherein said enclosure is a barn for the drying/storage of grain and further comprises a four sided wall structure of finite height to support said grain and for confining said upwardly directed air to said grain.

7. The enclosure of claim 3 further comprises one or more of said tubular arrays stacked one above the other.

8. An enclosure for solar-heated air drying/storing of crops as set forth in claim 1 wherein said multiplicity of air ports in said tubing are evenly distributed throughout said tubing.

9. An enclosure of claim 1 wherein said multiplicity of air ports is a series of ports on the upper side of said tubing.

10. An enclosure of claim 1 wherein said absorbent material is positioned intermediate said transparent side and said wall.

* * * * *